No. 721,658. PATENTED MAR. 3, 1903.
J. BIRCH.
CHEESE CUTTER.
APPLICATION FILED JUNE 9, 1902.
NO MODEL. 3 SHEETS—SHEET 1.
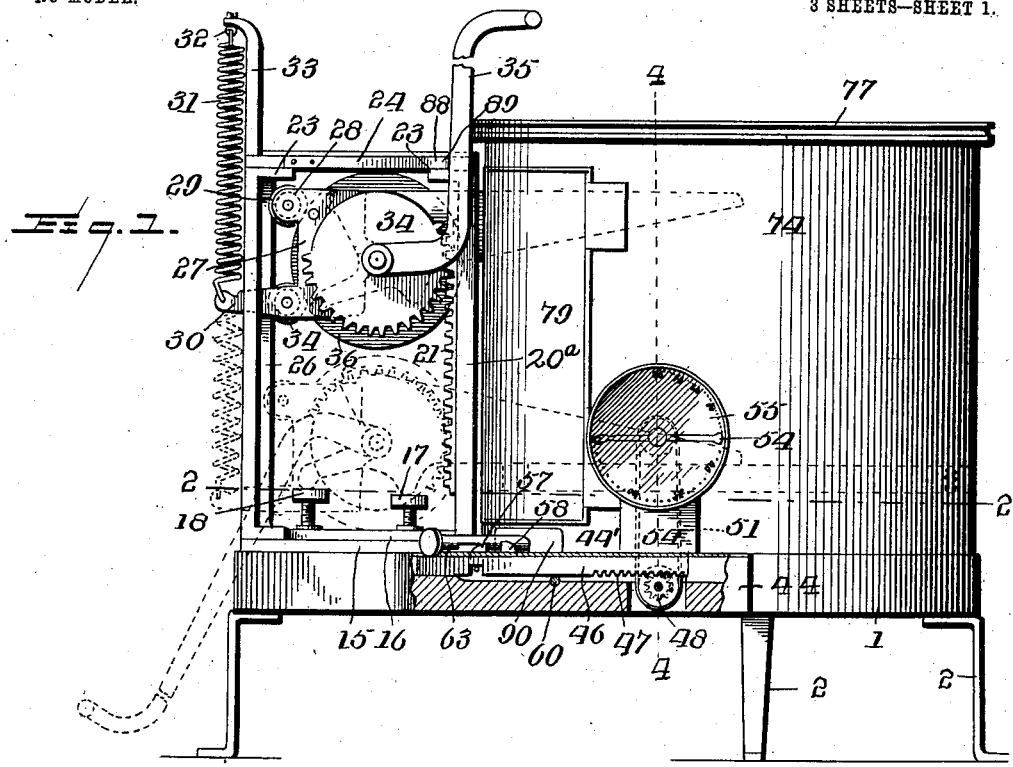
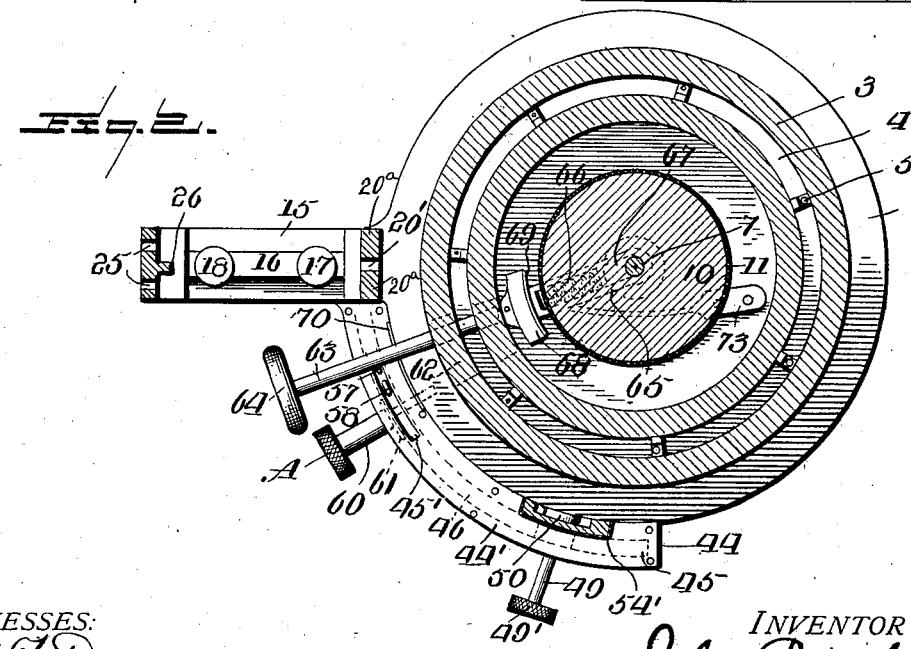
WITNESSES: INVENTOR
W. F. Doyle. John Birch
Chas. M. Havell. BY H. C. Everts
Attorney.

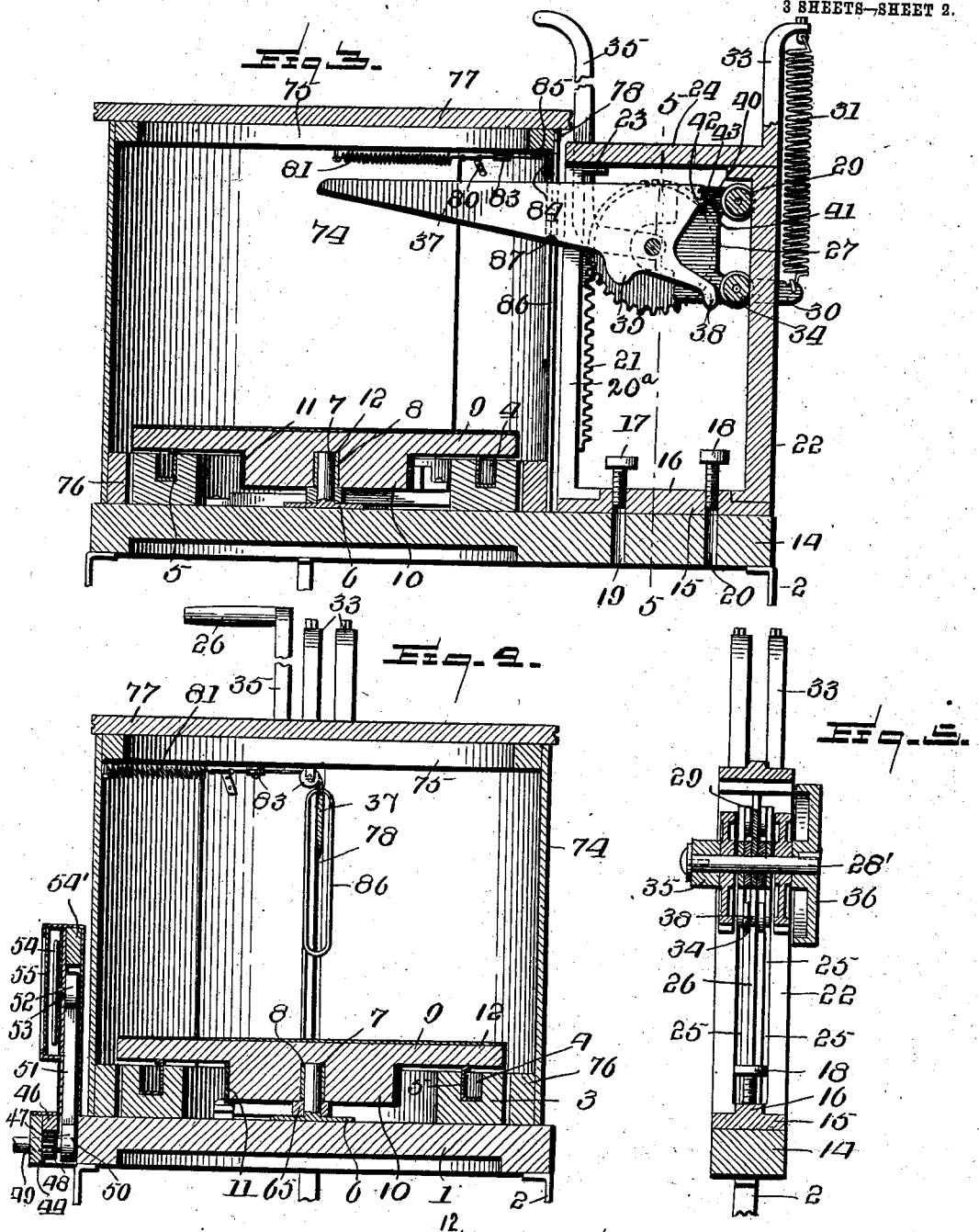

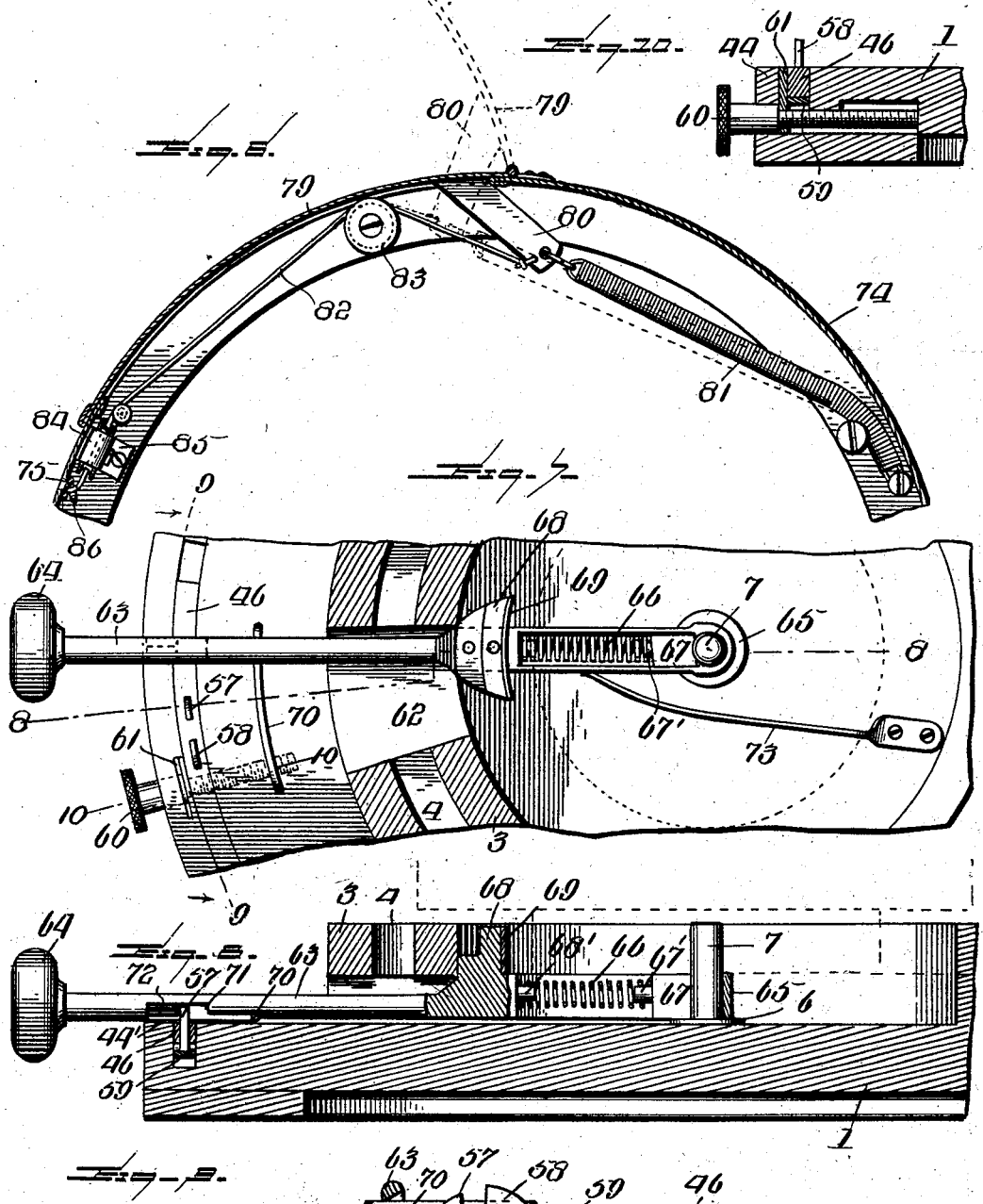

UNITED STATES PATENT OFFICE.

JOHN BIRCH, OF McCONNELSVILLE, OHIO.

CHEESE-CUTTER.

SPECIFICATION forming part of Letters Patent No. 721,658, dated March 3, 1903.

Application filed June 9, 1902. Serial No. 110,841. (No model.)

*To all whom it may concern:*

Be it known that I, JOHN BIRCH, a citizen of the United States of America, residing at McConnelsville, in the county of Morgan and State of Ohio, have invented certain new and useful Improvements in Cheese-Cutters, of which the following is a specification, reference being had therein to the accompanying drawings.

This invention relates to certain new and useful improvements in cheese-cutters, and relates more specifically to that class employing a rotatable table to support the cheese and a vertically-reciprocating knife for severing or slicing the cheese into sections or pieces of desired weight or value.

The object of the invention is to provide means for rotatively supporting the cheese and moving the same a desired or predetermined distance for slicing or cutting, providing means for accurately determining the weight of the piece desired to be cut, or if the value system is being employed to accurately move the cheese to slice or cut a piece of the desired value.

My invention has for its further object to improve the knife mechanism whereby the knife will be caused to pass more readily through the cheese and to provide means whereby the knife, when the limit of its travel is approached, will be tilted or operated in such a manner as to cause the same to engage throughout the length of its edge with the supporting-table of the cheese to effectually make the cut entirely through the cheese.

My invention also has for its object to provide means whereby the knife in its descent through the cheese automatically opens the door of the cheese-box and holds the door open until such time as the cutting operation is completed, permitting the door to automatically close as the knife is returned to its normal position.

Various other improvements in cheese-cutting mechanism are contemplated in my present invention, and these will all be hereinafter specifically described, and then particularly pointed out in the claims, and in describing the invention in detail reference will be had to the accompanying drawings, forming a part of this specification, and wherein like numerals of reference will be employed for indicating like parts throughout the several views, in which—

Figure 1 is a side elevation of my improved cheese-cutter, partly in section. Fig. 2 is a horizontal sectional view taken on the line 2 2 of Fig. 1. Fig. 3 is a central longitudinal sectional view. Fig. 4 is a transverse vertical sectional view taken on the line 4 4 of Fig. 1. Fig. 5 is a central vertical sectional view taken on the line 5 5 of Fig. 3. Fig. 6 is a horizontal sectional view of a part of the cheese-box looking toward the cover, with latter removed, showing the door-opening mechanism. Fig. 7 is a top plan view of a part of the base or bed plate, a portion of the circular track being shown in section, showing more clearly the operating-lever. Fig. 8 is a cross-sectional view thereof, taken on the line 8 8 of Fig. 7. Fig. 9 is a cross-sectional view taken on the line 9 9 of Fig. 7, and Fig. 10 is a like view taken on the line 10 10 of Fig. 7. Fig. 11 is a transverse vertical sectional view of a part of the base or bed, the annular track, and supporting-table, showing a modified form of table-support.

To put my invention into practice, I provide a base or bed 1, which if made from metal may be cast and have supporting-legs 2 formed integral therewith or secured thereto in any suitable manner, and if made from wood or like lighter material the supporting-legs will of course be secured to the base by suitable fastening means. This base or bed has mounted on its upper face and made stationary therewith an annular track 3, which is provided in its upper face with a circular groove 4, preferably placed midway of the upper face of the track, and in this groove, at suitable intervals, I secure a series of supports 5, preferably of metal, with small flat heads or tops, the supports being made fast to the bottom of the groove by screws or other suitable means.

Centrally mounted on the upper face of the base or bed 1 is a pedestal-plate 6, carrying an upwardly-extending journal-pin 7, which fits into a socket 8, provided therefor centrally of the underneath face of the cheese-supporting table 9. This socket 8 is made centrally of the annular boss 10, carried on the underneath face of this supporting-table 9, the periphery of this boss 10 being provided with a band or covering 11, of fabric or other suitable material, in order that a firmer gripping contact may be had therewith for a purpose as will presently appear. The table 9 is adapted to be rotated upon the journal-pin 7, the supports 5 serving to center the table at all times in order that easy rotative movement may be imparted thereto. In lieu of these supports 9 I may employ small rollers 3', which I in such case journal in the groove 4, partially projecting above the edge of the track 3, as shown in Fig 11, in order to be engaged by the table. However, I have employed both the supports described and the rollers, and in practice have found the supports the more satisfactory.

The rotating supporting-table 9 may be made of wood, fiber, or like material; but I prefer to construct the same of metal and on the upper face thereof firmly secure a covering 12, of suitable fabric or fibrous material, into which the knife-edge will engage after completing the cut through the cheese, and thus prevent the said edge from being brought into direct contact with the supporting-table face.

Either secured to the base or formed integral therewith at one side of the periphery is an extension or arm 14, to the underneath face of which one of the supporting-legs 2 is attached. This extension or arm is adapted to support the knife-frame, which is rigidly secured upon said extension or arm. This frame embodies a base-plate 15, securely fastened, as by screws or like means, to the extension or arm and which has a central longitudinal rib or flange 16 on its upper face, in which is mounted adjustable set-screws 17 and 18, both acting as stops for a purpose as will later appear in the specification. The apertures through the base 15 to receive these screws register with like apertures provided in the extension or arm, as shown at 19 20, in order that the screws or stops may be adjusted to the extreme limit in both directions. The base-plate 15 has secured thereon at its inner end a pair of standards 20ª, which are spaced a slight distance apart, so as to form a knife-passage 20', through which the vertically-operating knife reciprocates. Each of the standards 20ª carry on their outer face a rack-bar 21, which extends the greater distance of the length of the standards, though it is not necessary that these rack-bars be of the same length of the standards, since it is not required in order to impart the full travel to the knife.

Secured on the upper face of the plate 15, at the outer end of said plate, is a standard 22, which, like the standards 20ª, is provided at its upper end with an inturned end 23, to which inturned ends of the standards the cross-head or cross-bar 24 of the frame is rigidly secured by screws or other suitable fastening means. The standard 22 is provided with a pair of vertical slots 25, forming guideways for a purpose as will presently appear.

The standard 22 also has on its inner face between these two slots or guideways 25 and extending vertically throughout the length of the inner face of said standard a track 26 to receive rollers of the knife-carriage, as will be more fully explained.

The knife-carriage and knife-operating mechanism comprise two frame-plates 27, in which the crank-shaft 28' is journaled. These frame-plates carry at their upper rear corners extending lugs or ears 28, between which is journaled a small grooved roller 29, which travels on the track 26. These plates also have at their rear lower corners extending arms 30, which project through the guide-slots 25 and have connected to their ends extending beyond the standard 22 the lower ends of suitable coil-springs 31, the upper ends of which springs are connected to eyes 32, carried by standards 33, that extend upwardly from the rear end of the cross-head 24 in line with the standard 22. The extending arms 30 of the frame-plates 27 also carry a grooved roller 34, journaled between the plates and which travels on the vertical track 26 in the same manner as the grooved rollers 29. Mounted on the crank-shaft 28 outside the frame-plates 27 is a pair of mutilated cogs or pinions 34. These cogs or pinions I prefer to provide with teeth for but a portion of their periphery, as only a partial revolution of the cogs or pinions is necessary to complete the travel of the knife, and by mutilating the cogs or pinions I obtain more cleanly mechanism and also decrease the liability of the operator's clothing catching in this portion of the knife-operating mechanism. The crank-shaft 28' is extended at one end a sufficient distance to permit the securing thereon of the operating-crank 35, which may be secured by a key or in any suitable or desired manner. This operating-crank is provided with a suitable handle 26, (see Fig. 4,) and the crank in practice is made of a sufficient length that great leverage may be obtained. On the other end of the crank-shaft 28' is secured by a key, as shown, or in any other suitable manner, a wheel 36, which acts not only as a balance, but incloses the cog or pinion on this side of the carriage. The knife 37 is mounted on the crank-shaft 28' (the latter being free to rotate within the knife) between the two plates 27 and is spaced and held positioned between the plates by bosses which may be formed either on the sides of the knife or on the plates 27, as may be found most convenient and desirable in construction. This knife is constructed with an angular or inclined cutting edge, as shown, and is provided at its rear end on the underneath edge of the presser-foot 38 and a stop-lug 39 to engage, respectively, with the stops 17 and 18, as will be more fully explained. At its upper rear corner the knife has connected thereto a coil-spring 40, the other end of which is connected to a pin or short shaft carried between the plates 27, and a like pin or shaft 42 is carried by these plates 27 near the upper rear corner of the knife to be engaged by a heel 43 on said knife to limit the movement of the knife by the spring 40. The toothed portion of the cogs or pinions, it will be understood, is in engagement with the racks 21, and the knife projects through the slot or knife-passages between the two standards 20ª, extending out over the rotative table 9 to or about to a central point in said table. The means by which the table is rotated the desired distance and the means by which the distance is determined will now be described.

The base or bed 1 is provided at one side of its periphery and connecting with the extension or arm 14 with a segment-shaped extention 44, (see Fig. 2,) which is provided in the upper face with a groove 45. In this groove is fitted a stop-slide 46, segment-shaped to conform to the groove in which it is adapted to travel or to be actuated as will be described. This stop-slide is provided on its underneath face for a distance at the outer end thereof with teeth 47, which are in mesh with a pinion 48, carried on a shaft 49, journaled in the extension 44 and bed or base 1. This shaft also carries a small pulley 50, (see Fig. 4,) which receives a belt 51 passing thereover and over a like pulley 52, forming a part of the measuring or indicating mechanism. This indicating mechanism consists of a shaft 53, on which the pulley is mounted, and an indicator or hand 54. The shaft is journaled in a suitable casing 54', suitably secured to the extension 44 and having a dial 55. It is preferable to inclose this dial with a glass plate in order that the same may be readily read and yet not be tampered with. This indicating mechanism may be made so as to determine by weight or by value of the cut made from the cheese. It may therefore be provided with marks indicating pounds and fractions thereof or amounts indicating values, and to this end the dial may be constructed with circumferentially-arranged marks indicating both weight and value. If such a certain weight is to be obtained, the pointer will be moved to the mark indicating the desired weight, and if a cut is to be made indicating a certain value the hand will be moved to the point on the dial indicating that value. The shaft 49 is provided on its outer end with a thumb-nut 49' for ease in operating the shaft to move the indicating-hand to the desired point. The stop-slide 46 is actuated by the pinions 48, engaging the teeth 47 of said slide, and this slide carries two stop-lugs 57 and 58 of varying heights. The stop-lug 57 is of less height than the lug 58, and this lug 47 extends through the stop-slide and is normally held in its elevated position by means of a flat spring 59 (see Fig. 8) on the under face of the stop-lug 46. The lug 57 may therefore be depressed into the stop-slide, and the exact function of this will more presently appear. After the stop-slide has been moved to the desired distance by means of turning the shaft 49 it is clamped in this position by means of a set-screw 60, journaled in the extension 44 underneath the stop-slide and carrying a clamp 61 (see Fig. 10) to impinge against the outer face of the stop-slide. This clamp is arranged in a recess provided therefor in the side wall of the slot in which the stop-slide is arranged. The mechanism for rotating the table 9 the desired distance to obtain a cut the weight or value of which agrees with the point to which the dial has been moved will next be described.

The annular track 3 is provided at one point of its periphery with a slot 62. Through this slot is extended the operating-shaft 63, which is provided with a knob or handle 64 on its outer end. This shaft 63 at its inner end carries a strap or yoke 65, which loops over the journal-pin 7 and is normally held in its extended position by means of a coil-spring 66, which at its one end bears against the end of the yoke, and at its other end bears against and is held by a journal-block 67, arranged between the two arms of the strap or yoke and bearing against the journal-pin 7. This journal-block in order to hold the spring securely is preferably constructed with a pin 67' on its end to extend into the end of said spring. The shaft carries just inside the track 3 a friction-block 68, which in practice is either corrugated on its inner face or provided with a facing 69, composed of material which will take firm hold of the band or facing 11 on the boss 10 of the table. A pin 68' on the inner face of the block 68 receives the other end of the spring 66. A small slide 70 is preferably provided, as shown, for the shaft 63 to operate upon. The shaft 63 on its under side at a point over the stop-slide is provided with a notch 71, and the under side of the shaft is recessed adjacent to this notch, so as to form the shoulder 72, adapted to engage and depress the spring-pressed lug 57, as will be described in the operation. In order to hold the shaft 63 in its normal position and to return the same to this position after each partial revolution of the table, a spring 73 is secured to the upper face of the base or bed 1 and bears against the side of the strap or yoke 65.

In connection with devices of this nature it is customary to provide a cheese-box or cover for the cheese. In my device I provide means within this cover or cheese-box for engagement with the knife during the cutting stroke of the latter, whereby the door of the cheese-box is opened to permit the removal of the piece cut from the cheese. I employ a cheese-box the body of which is composed of screen or glass, and I therefore do not wish to confine myself to the form of cover shown in this patent and which will now be described. In the present showing the body is constructed of thin wood or sheet metal, this body 74 being secured to a suitable upper hoop or band 75 and a suitable lower hoop or band 76. The table 9 and track 3 are generally constructed of a diameter which will leave sufficient space for the cheese-box to fit down over said table and track and rest upon the base or bed 1, as shown clearly in Figs. 3 and 4 of the drawings, and a suitable cover 77 is secured to the upper hoop or band 75. This cheese-box or cover where the knife projects into same is provided with a suitable slot 78, forming a knife-passage to permit the operation of said knife, and to remove the cheese-box the knife is elevated to the position shown in Fig. 3, so that the cheese-box may be elevated until the lower end thereof is above the table, at which time it may be moved outwardly to strip same from engagement with the knife, as will be apparent. The door 79 (see Figs. 1 and 6) is hinged to the body of the cheese-box and forms a part thereof. Near its top, adjacent to the hinged edge thereof, I provide this door with an extending arm 80, to the outer end of which is connected one end of a stiff coiled spring 81, the other end of this spring being connected to the upper hoop or band 75 of the cover. Also connected to the outer end of this arm 80 is the one end of a cord, cable, or chain 82, which is passed over pulleys 83 84, disposed with their axis in angular relation to each other, the pulley 83 being mounted on a pin or shaft secured in the hoop 75 and the pulley 84 being journaled on a pin or shaft secured in the body 74 and in a small bracket 85, attached to the hoop or band 75. The pulley 84 is located adjacent to the knife-slot 75 in the cheese-box or cover, and the other end of the cord, cable, or chain is connected to a loop 86, through which the knife 37 extends. The knife 37 is provided in its cutting edge, at a point back of where it engages with the cheese, with a small notch 87, which receives the lower end of the loop 86, the latter being of a length so that the knife will not engage therewith until it has completed the major portion of its travel through the cheese, at which time the engagement of the knife with the loop carries the latter downward as the knife continues to descend, so as to automatically open the door, whereby the cut-off piece of the cheese may be removed. The door is held in its opened position so long as the knife is maintained at the lowered point; but when the knife is elevated by lifting on the crank the door is automatically closed by the spring 81. The crank is held in the elevated or normal position preferably by means of a spring 88, (see Fig. 1,) attached to the side of the crosshead 24 and provided with an offset 89 to engage back of the crank after the latter has passed same. This spring being fastened at its one end and bent outward slightly at the other end, this offset will normally project in the path of travel of the crank, and the latter may readily be released for operation by forcing inward on the offset, so as to permit the crank to be lowered. The cheese-box or cover is provided with a slot 90, (see Fig. 1,) registering with the slot 62 in the track 3, in order that the shaft 63 may be operated.

I will now describe in detail the operation of my improved cheese-cutting machine, assuming all parts to have been assembled in their respective positions, as shown and described. The cutting-knife will be in the elevated position, as shown in Fig. 3, and the cheese (not shown) placed upon the table 9. The stop-slide 46 is released by unscrewing the set-screw 60, which withdraws the clamp 61 from inpinging engagement with the side of the stop-slide. This releases the gearing to the indicator or dial shaft, and this shaft 49 is now turned and through the medium of the pulley 50, belt 51, and pulley 52 the dial hand or pointer 54 is moved to the desired designating-mark on the dial. For instance, we will assume that it is desired to cut one pound from the cheese. The dial hand or pointer is moved to the one-pound mark on the dial, this operation also moving the stop-slide in its groove. The set-screw 60 is now tightened, so as to hold the stop-slide and the dial indicator or hand at the position to which they have been moved. The operator then presses inward on the shaft 63, which causes the friction-block 68 to impinge and grip the periphery of the boss 10, carried by the table, and while this shaft 63 is under this inward pressure it is moved around toward the dial, or toward the right, thus rotating the table and the cheese carried by the latter. The shaft by being thrust inward has been so placed that the shoulder 72 will be in the path of the spring-pressed lug 57, which lug it engages, depressing same until it has passed thereover, at which time the spring on the under side of the stop-slide returns the lug to its elevated position in back of the shoulder 72 on the shaft, preventing return movement of the shaft (by spring 73) so long as the same is under the inward pressure, while further movement of the shaft toward the dial is prevented by the engagement of the shoulder 72 with the lug 58, carried by the stop-slide. The operator then relieves the pressure slightly on the shaft 63, so as to permit the spring 66 to force said shaft outward until the lug 57 and notch 71 are opposite, at which time the shaft 63 will be returned to its normal position by reason of the spring 73 bearing against the same. The cheese has now been turned the desired distance, and the operator takes hold of the crank-handle with the one hand and turning the crank downward as far as it will go causes the knife to pass downward through the cheese. The edge of this knife, as heretofore stated, is at an incline, as it is well known that a cleaner cut may be made when the cutting edge is at an incline than when the entire cutting edge of the instrument is on the same horizontal plane. The knife descends through the cheese under the pressure of the crank and operating mechanism until the presser-foot 38 comes in engagement with the stop 18, which will tend to tilt or throw the forward end of the knife downward, so as to bring the cutting edge on the same plane throughout, and when this has been accomplished the stop-lug 39 will have engaged the stop 17, preventing further tilting or downward movement of the knife. As soon as the pressure on the knife is relieved and the crank is turned backward, so as to elevate the knife, the spring 40 returns the knife to its normal position, its movement by the spring being limited by the stop-pin 43 being engaged by the heel 42. The stops 17 18 are, it will be observed, adjusted to different heights, so that the presser-foot 38 will first engage its stop and impart the tilting movement to the forward end of the knife, whereby a complete cut is made, at which time the lug 39 on the knife engages its stop 17 and the movement of the knife arrested just when the cut has been completed. During the descent of the knife the latter has engaged with the loop 86 prior to the cut being completed and carries this loop downward therewith, thus causing the same, through its cord, cable, or chain connection with the arm 83 of the door 82, to open said door automatically with the operation of the knife, so that the operator may employ the other hand for removing the piece that has been severed from the cheese. As the knife is returned to its normal or elevated position the spring 81 again closes the door and draws up the loop 86, so that the latter will again be in position to be engaged by the knife on the succeeding operation. The springs 31, it will be observed, are not essential to the operation of the device; but they are preferably employed, since they serve to counteract the disadvantage in leverage which the knife has to contend with in passing through the cheese. In Fig. 1 the mechanism is shown in full lines in the position it assumes when the knife is elevated, (said knife in this view being in dotted lines in this position,) and in dotted lines the mechanism is shown in the position it assumes when the cut has been completed.

As heretofore stated, the machine is adapted to either weight or value determination, and to illustrate this we will assume first that a cheese weighing twenty pounds is placed on the table. In order to make provision for small cuts—one-half pounds—I designate the weight of the cheese as "forty half-pounds" instead of "twenty pounds." The dial hand or pointer will be set at mark "40" on the dial, and each time the table is turned partially around there has been marked off just one-half pound. It will be evident that when so set it is not necessary, in order to make a cut which would sever a pound instead of one-half pound, to reset the mechamism; but instead the shaft 63 would be operated twice instead of once, and so on up to as many pounds as were desired in the cut. The value system is on the same plan, except that the dealer must determine what the whole cheese is to amount to previous to setting the dial hand. Suppose it is intended to sell the twenty-pound cheese at twelve cents per pound. It would amount to two dollars and forty cents or to forty-eight five-cent cuts. The dial-hand would be set at "48," and each operation of the shaft 63 would mark off just five-cents worth. To obtain ten-cents worth in the same cut, the shaft 63 would be operated twice instead of once, and so on up to any desired amount within the limit of the cheese.

While I have herein shown and described a practical embodiment of my invention as used by me, yet it will be evident that changes in construction may readily be made—such, for instance, as employing sprockets and a chain in lieu of the pulleys and belt for the dial and like changes—which will come clearly within the scope of the invention, and I therefore do not desire to limit myself to the exact construction shown and described, but claim the right to such minor alterations as do not tend to alter the principle of the device.

Having described my invention, what I claim as new, and desire to secure by Letters Patent, is—

1. In a cheese-cutter, the combination with a vertically-reciprocating knife, and means for reciprocating said knife, of a cheese-box having a door, and means engaged by the knife in its descent to automatically open the door of said box.

2. In a cheese-cutter, a cheese-box provided with a door, a vertically reciprocatory and oscillatory cutter operating within the cheese-box, and mechanism for automatically opening the door of said box at the finish of the stroke of the cutter.

3. In a cheese-cutter, a rotatable table, a vertically-reciprocatory knife, an indicating mechanism, a stop-slide, means for operating said indicating mechanism and slide simultaneously, a stop-lug carried by said slide, means adapted to be engaged with said table for rotating the same and to engage said lug at each operation to limit the movement of the table, and means for operating said knife.

4. In a cheese-cutter, a rotatable table, a vertically-reciprocating knife, means for operating said knife, a spring-pressed operating-shaft, a friction-block carried by said shaft for engagement with the table to operate the same, a stop to limit the movement of the shaft and table at each operation of the shaft, and means for imparting an oscillatory movement to the knife during the completion of its cutting stroke.

5. In a cheese-cutter, a rotatable table, means normally out of engagement with the table adapted when forced inwardly to engage the table to rotate the same, means for limiting the movement of the table at each operation, an indicating mechanism, means for actuating said indicating mechanism, a vertically-movable knife-carriage, a knife mounted in said carriage for vertical movement therewith and having oscillatory movement independent of the carriage, and means for engagement with the said knife during the completion of its stroke to impart an oscillatory movement thereto, substantially as described.

6. In a cheese-cutter, the combination with a rotatable supporting-table, and means for rotating said table, of a vertically-movable knife-carriage, a knife carried by said carriage and having an oscillatory movement independent of the carriage, means for operating the carriage and knife vertically, and separate means for imparting an oscillatory movement to the knife independent of the carriage during the completion of the stroke, substantially as described.

7. In a cheese-cutter, the combination of a rotatable table, operating means therefor, a vertically-reciprocatory knife-carriage, a knife carried by said carriage and having oscillatory movement independent of the carriage, means for vertically reciprocating the knife and carriage, and means for engagement with said knife for imparting an oscillatory movement thereto during the completion of its downward reciprocating movement, substantially as described.

8. In a cheese-cutter, the combination with a vertically-reciprocating knife-carriage, a frame in which said carriage reciprocates, a knife carried by the carriage and having an oscillatory movement independent of the carriage, means for operating the carriage and knife vertically, a presser-foot carried by the knife, a stop adapted to be engaged by the presser-foot to impart an oscillatory movement to the knife independent of the carriage, and a stop-lug and stop for limiting the oscillatory movement imparted to said knife, substantially as described.

9. In a cheese-cutter, the combination with a vertically-reciprocating knife, and means for reciprocating said knife, of a cheese-box having a door, means engaged by the knife in its descent to automatically open the door of said box, and means to automatically close the door as the knife ascends, substantially as described.

10. In a cheese-cutter, a base or bed provided in its upper face with a circumferential groove, supports mounted in said groove, a table rotatably mounted on the base or bed and engaging said supports, an operating-shaft, a spring-held block carried by said shaft for engagement with the table to rotate the latter, a stop-slide mounted in the base or bed, stop-lugs carried by said slide for limiting the movement imparted to the table at each operation of the latter, an indicating mechanism, means for operating the indicating mechanism and stop-slide simultaneously, a vertically-reciprocating cutting-knife, and means for operating said knife, substantially as described.

11. In a cheese-cutter, a table adapted to carry a cheese an operating-shaft, means carried by the shaft for engagement with the table to operate the latter, an indicating mechanism, a stop-slide for limiting the movement of the table at each operation thereof, means for operating the stop-slide and indicating mechanism simultaneously, a vertically-reciprocatory knife, means for reciprocating said knife vertically, means for imparting an oscillatory movement to said knife during the completion of its cutting stroke, and means connected to the rear end of the knife to compensate for the resistance offered to the knife during its passage through a cheese.

12. In a cheese-cutter, the combination with a bed or base, and a rotatable supporting-table, of a vertically-reciprocatory knife-carriage, guides in which said carriage operates, a knife carried by said carriage and having oscillatory movement independent of the carriage, and separate means for imparting oscillatory movement to the knife during the completion of its downward or cutting stroke.

In testimony whereof I affix my signature in the presence of two witnesses.

JOHN BIRCH.

Witnesses:
P. H. TANNEHILL,
HELEN TRAIN TANNEHILL.